United States Patent [19]
Lloyd et al.

[11] Patent Number: 5,093,212
[45] Date of Patent: Mar. 3, 1992

[54] ELECTRONIC DEVICE HAVING AN AIR REGULATING BATTERY COMPARTMENT RESPONSIVE TO ELECTRICAL LOAD CONTROL

[75] Inventors: Robert D. Lloyd; Michael J. DeLuca; Tuan Nguyen, all of Boca Raton, Fla.

[73] Assignee: Motorola, Inc., Schaumburg, Ill.

[21] Appl. No.: 445,308

[22] Filed: Dec. 4, 1989

[51] Int. Cl.$^5$ .................... H01M 8/04; G08B 5/22
[52] U.S. Cl. .................................... 429/27; 429/34; 340/311.1; 340/326; 340/825.44; 455/232
[58] Field of Search .............. 429/48, 34, 97, 100, 429/27; 340/825.44, 311.1, 326; 455/232

[56] References Cited
U.S. PATENT DOCUMENTS

| | | |
|---|---|---|
| 2,074,506 | 3/1937 | Heise . |
| 2,468,430 | 4/1949 | Derksen . |
| 2,632,032 | 3/1953 | Winckler . |
| 3,837,921 | 9/1974 | Henssen . |
| 3,963,519 | 6/1976 | Louie . |
| 4,118,544 | 10/1978 | Przybyla et al. ............... 429/27 |
| 4,189,526 | 2/1980 | Cretzmeyer et al. ........... 429/27 |
| 4,202,935 | 5/1980 | Malcolm ...................... 429/48 |
| 4,262,062 | 4/1981 | Zatsky ......................... 429/27 |
| 4,493,880 | 1/1985 | Lund ........................... 429/97 |
| 4,752,539 | 6/1988 | Vatter .......................... 429/97 X |
| 4,880,712 | 11/1989 | Gordecki .................... 429/100 X |
| 4,935,735 | 6/1990 | DeLuca et al. .............. 340/311.1 X |
| 5,007,105 | 4/1991 | Kudoh et al. ................ 455/344 |

FOREIGN PATENT DOCUMENTS 61-177035 8/1986 Japan ................. 340/311.1

OTHER PUBLICATIONS

"Bravo" Series Theory/Maintenance Manual 68P81010B05-O, 1989.
"PMR 2000" Series Instruction Manual 68P81048C80-A, 1987.
PMR 2000 Sales Brochure, 1987.

Primary Examiner—Stephen Kalafut
Attorney, Agent, or Firm—Vincent B. Ingrassia; Thomas G. Berry

[57] ABSTRACT

A sealing apparatus supplies one or more activating gases needed to produce a current generating chemical reaction in an air breathing battery, the supply of one or more activating gases being proportionally controlled to coincide with differing current loads.

16 Claims, 1 Drawing Sheet

ELECTRONIC DEVICE HAVING AN AIR REGULATING BATTERY COMPARTMENT RESPONSIVE TO ELECTRICAL LOAD CONTROL

FIELD OF THE INVENTION

This invention relates in general to the field of energy sources, and more specifically, to a sealing arrangement for regulating the discharge rate and maximum current drain of a battery.

BACKGROUND OF THE INVENTION

Battery powered devices (e.g., pagers) have historically relied on batteries as their main power source. As these devices become smaller, the battery occupies an increasing amount of space relative to the remainder of the device's size. Therefore, it is desirable to reduce the size of the battery while maintaining at least the same energy capacity as contemporary batteries. Air-breathing (e.g., zinc-air) batteries meet these requirements, and therefore, are becoming more widely used in selective call receivers. As is known, proper zinc-air battery operation relies on air availability since the internal chemical reaction that occurs in a zinc-air battery results from the oxygen-zinc reaction.

Contemporary zinc-air battery construction incorporates the zinc into a casing having a number of holes to allow air to reach the zinc. These holes are initially sealed to prevent the zinc from prematurely reacting with the air (which reduces the battery's shelf-life). Before using the battery to power a product, the seal(s) covering the air-holes is removed so as to allow the infiltration of air.

Generally, battery manufacturers attempt to produce batteries that will meet the broadest market demand. Therefore, it is common to manufacture batteries with a larger amount (or size) of holes than necessary to meet the needs of many applications. Regrettably, this practice tends to result in premature fuel exhaustion (commonly referred to as "self-discharge"). That is, since the zinc-air reaction is dependent upon the amount of oxygen allowed to reach the zinc, the resulting continuous chemical reaction is often in excess of the requirements of the device due to the excessive number of holes, and therefore, the amount of air supplied. Thus, a need exists for a method to regulate an air-breathing battery in which the chemical reaction may be selectively controlled depending on the power requirements of the device being operated.

SUMMARY OF THE INVENTION

In carrying out the above, there is provided in one form of the invention a method for controlling the discharge rate of an energy storage means (e.g., a battery), while providing a desired current comprising a sealing means for controlling the amount of one or more activating gases provided to the energy storage means.

DETAILED DESCRIPTION OF THE INVENTION

Figure 1:
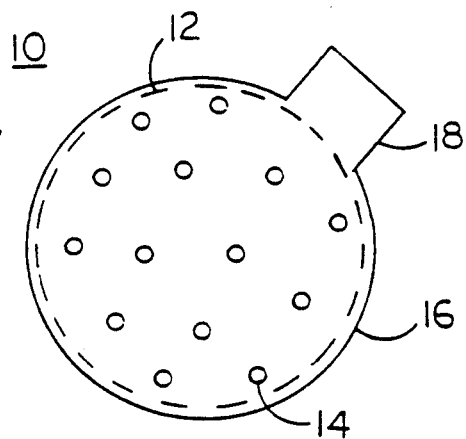
FIG. 1 is an illustration of a conventional zinc-air battery.

Referring to FIG. 1, a typical air-breathing battery 10 comprises a sealed (16) outer casing 12 having a plurality of supply holes 14 for facilitating the passage of at least one activating gas (e.g., air). Before using the battery 10 to power a product or device, the seal 16 is removed such as by pulling on an integral tab 18. This allows any surrounding atmospheric gases to contact an internal chemical substance via the now exposed supply holes 14. That is, the supply holes 14 allow oxygen and other gases to reach a chemical (e.g., zinc) thereby causing a chemical reaction, which generates electrical power. A number of chemicals and gases may be used to induce the chemical reaction without varying from the intent of the invention. As will be appreciated, if an over-supply of air reaches the chemical, a larger than necessary chemical reaction occurs, which reduces the operational lifetime of the battery. Thus, exposing all of the supply holes 14 to the atmosphere results in the battery 10 self-discharging at a more rapid rate than if the air supply holes 14 were only partially exposed. This results in the battery 10 discharging more rapidly than necessary even when not powering a device or product.

Figure 2A:
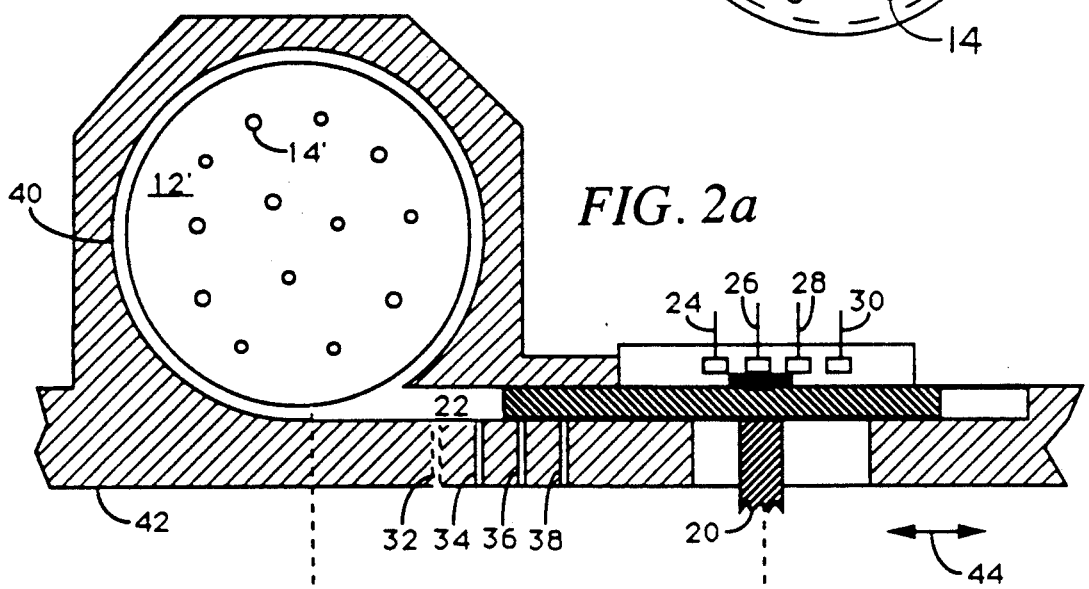
FIGS. 2a-2c are illustrations of a seal in accordance with the present invention.
Figure 2B:
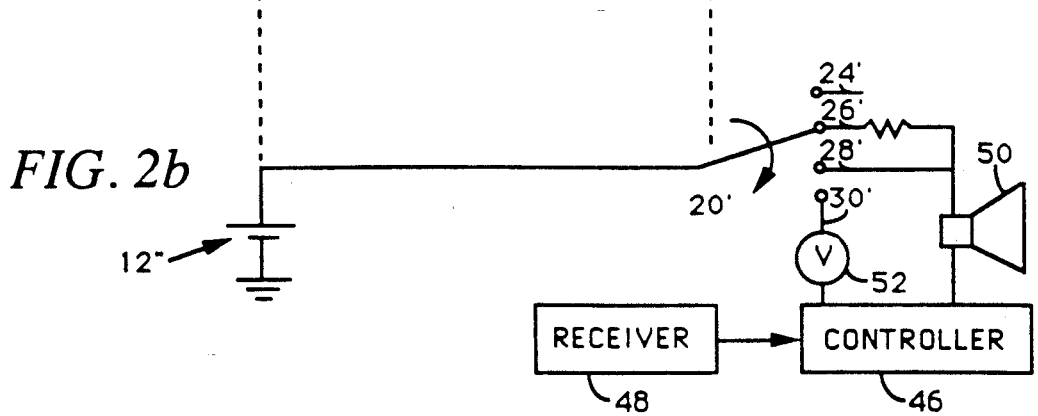
Figure 2C:
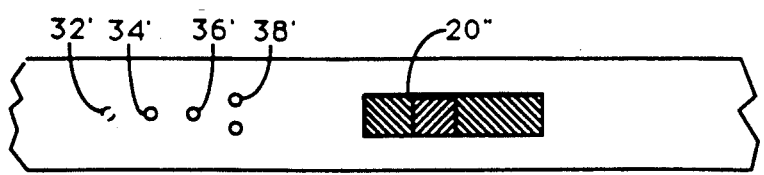

Referring to FIGS. 2a-2c, the present invention can be seen to employ a slide mechanism 20 (20' and 20") to regulate the amount of surrounding atmospheric gases that may contact internal chemical(s) of the battery 12' (12"). In the preferred embodiment, three openings 34 (34'), 36 (36'), and 38 (38') and one optional opening 32 (32') control the battery's self-discharge and maximum current drain by allowing the power supplied to more closely match the requirements of the intended device. The number and size of these openings 34 (34'), 36 (36'), and 38 (38') may vary without deviating from the intent of the invention.

Operationally, a receiver 48 receives a message, which is processed by a controller 46. Depending upon the position of the slide mechanism 20 (20' and 20"), the controller 46 activates either the low volume mode 26 (26'), the high volume mode 28 (28'), the vibrate mode 30 (30'), or remains in the "off" mode 24 (24'). This method of regulation is accomplished by positioning the slide mechanism 20 (20' and 20") in a direction 44 so as to selectively cover the openings 32 (32'), 34 (34'), 36 (36'), and 38 (38'), allowing the rate of air flow to the battery 12' (12") to more closely match the electrical requirements of the device in which it is used (e.g., a selective call receiver). The supply holes 14' of the zinc-air battery 12' (12") are constantly exposed in a chamber 40, however, the atmospheric gases allowed to travel through a channel 22 and the supply holes 14' of the battery 12' (12") may be regulated by selectively exposing the openings 34 (34'), 36 (36'), and 38 (38').

The channel 22 is substantially the only means of air access to the chamber 40. In the preferred embodiment, positioning the slide mechanism 20 (20' and 20") over each opening 32 (32'), 34 (34'), 36 (36'), and 38 (38') corresponds to an "off" mode 24 (24'), a low volume (20 mA requirement) mode 26 (26'), a high volume (50 mA requirement) mode 28 (28'), and a vibrate (100 mA requirement) mode 30 (30'), respectively. The chemical reaction is effectively halted when the slide mechanism 20 (20' and 20") is positioned in the "off" mode 24 (24') since no additional atmospheric gases are allowed to enter the chamber 40. The chamber 40 serves as a storage means for storing the energy source means (battery) 12' (12"). The opening 32 (32') may be present to provide minimal energy to maintain an optional volatile memory feature while the product is in the "off" mode 24 (24'). Alternately, the opening 32 (32') may be eliminated if no current is required (e.g., volatile memory feature is not present) when the device is switched off, thereby eliminating the battery's self-discharge when the device is in the "off" mode 24 (24') for an extended period of time. Therefore, the battery 12' (12") would be unable to self-discharge due to the slide mechanism 20 (20' and 20") preventing atmospheric gases from reaching the chamber 40. This feature allows the user to extend the operational life of the battery 12' (12") by shutting off the supply of atmospheric gases allowed to reach the battery 12' (12") when the device is not in use.

Positioning the slide mechanism 20 (20' and 20") in the low volume mode 26 (26') and the high bolume mode 28 (28') permits a voice message to be produced by a speaker 50. The low volume mode 26 (26') requires the least amount of energy and is, therefore, supplied by one opening 26 (26'). The high volume mode 28 (28') requires additional energy, relative to the low power mode 26 (26'), and is, therefore, supplied by openings 34 (34') and 36 (36'). Positioning the slide mechanism 20 (20' and 20") in the vibrate mode 30 (30') activates a vibrator 52. The vibrate mode 30 (30') requires a higher energy level than that needed by the low volume mode 26 (26') and the high volume mode 28 (28') combined, therefore, positioning the slide mechanism 20 (20' and 20") in the vibrate mode 30 (30') exposes openings 34 (34'), 36 (36'), and 38 (38'). With all opening 34 (34'), 36 (36'), and 38 (38') exposed, a sufficient amount of atmospheric gases is allowed to reach the battery 12' (12") to activate the vibrator 52. Thus, increasing the rate of passage of air into the battery area in response to the expected current drain of the paging receiver has been shown. This provides for increasing current producing capacity of the battery in accordance with the expected current drain of the paging receiver.

In the simplest form, this invention may be represented by one opening and a two position switch. In the first position, the device would be able to receive atmospheric gases, resulting in a chemical reaction and thus, available energy. In the second position, the opening would be completely closed, allowing no atmospheric gases to reach the battery 12' (12"), thereby extending the operational lifetime of the battery 12' (12"). By mechanically regulating the number of available openings in which atmospheric gases are allowed to pass, the battery's maximum current handling ability and self-discharge rate is regulated accordingly, thereby extending the life of the battery.

We claim:

1. An electrical device, comprising:
   electrical or electronic circuitry including at least a means for receiving messages, an audible alerting means, and a vibratory alerting means;
   storage means for storing an energy source means for providing energy in response to exposure to at least one activating gas;
   switching means for selectively activating or deactivating at least a portion of the electrical or electronic circuitry;
   sealing means, responsive to the switching means, for controlling passage of an effective amount of the at least one activating gas into said storage means to provide energy to the audible alerting means or the vibratory alerting means depending upon the switching means.

2. The electrical device according to claim 1 wherein said switching means and said sealing means enables said electrical or electronic circuit to consume a first amount of power from the energy source means in a first audible alerting mode by enabling a first rate of passage of the at least one activating gas into said storage means, and said switching means and said sealing means enables said electrical or electronic circuit to consume a second amount of power from the energy source means in a second audible alerting mode by enabling a second rate of passage of the least one activating gas into said storage means.

3. The electrical device according to claim 1 wherein said sealing means comprises a slide mechanism for selectively exposing and facilitating atmospheric gases to said storage means.

4. The electrical device according to claim 3 wherein said slide mechanism comprises a slide switch.

5. A method for controlling the discharge rate of a battery while providing a desired current, comprising the steps of:
   (a) controlling the amount of one or more activating gases provided to an energy storage means in response to a switching means operative to enable or disable certain electrical or electronic circuits including at least a means for receiving messages, an audible alerting means, and a vibratory alerting means; and
   (b) providing energy responsive to the one or more activating gases.

6. A selective call receiver, comprising:
   means for receiving a message;
   energy means, selectively coupled to the receiving means, for providing energy in response to exposure to at least one activating gas;
   audible alert means for providing a audible alert when a message is received;
   vibratory alert means for providing a silent alert when a message is received;
   switching means for selectively activating or deactivating at leas portion the audible alert means and the vibratory alert means;
   sealing means, responsive to the switching means, for controlling passage of the at least one activating gas to the energy means.

7. The selective call receiver of claim 6, wherein the sealing means is responsive to the switching means to facilitate the ingress of an increased volume of the at least one activating gas when the switching means activates one or more electrical or electronic circuits within the selective call receiver.

8. The selective call receiver of claim 6, wherein the sealing means is responsive to the switching means to imped the ingress of the at least one activating gas when the switching means deactivates one or more electrical or electronic circuits within the selective call receiver.

9. The selective call receiver of claim 6, wherein the sealing means is responsive to the switching means to substantially prevent the ingress of the at least one activating gas when the switching means deactivates the selective call receiver.

10. A selective call receiver, comprising:
    means for receiving a message;
    a battery selectively coupled to the receiving means, for providing energy in response to exposure to at least one activating gas;
    audible alert means for providing a audible alert when a message is received;
    vibratory alert means for providing a silent alert when a message is received;

switching means for selectively activating the audible alert and silent alert means; and sealing means, responsive to the switching means, for controlling passage of the at least one activating gas to the energy means.

11. The selective call receiver of claim 10, wherein the sealing means is responsive to the switching means to facilitate the ingress of an increased volume of the at least one activating gas when the switching means activates the silent alert means.

12. The selective call receiver of claim 10, wherein the sealing means is responsive to the switching means to imped the ingress of the at least one activating gas when the switching means deactivates the silent alert means.

13. The selective call receiver of claim 10, wherein the sealing means is responsive to the switching means to substantially prevent the ingress of the at least one activating gas when the switching means deactivates the selective call receiver.

14. A selective call receiver, comprising:

means for receiving a message;

energy means, selectively coupled to the receiving means, for providing energy in response to exposure to at least one activating gas;

non-volatile memory means coupled to the energy means;

audible alert means for providing a audible alert when a message is received;

vibratory alert means for providing a silent alert when a message is received;

switching means for selectively activating the audible alert and silent alert means; and sealing means, responsive to the switching means, for controlling passage of the at least one activating gas to the energy means such that an effective amount of the at least one activating gas is provided to the energy means to retain information in the non-volatile memory means.

15. A method for controlling a selective call receiver, comprising the step of:

(a) controlling the amount of one or more activating gases provided to an energy storage means in response to a switching means operative to enable or disable at least an audible alert means and a vibratory alert means.

16. The method according to claim 15, which includes the steps of:

(b) receiving a message; and (c) providing either an audible alert or a vibratory alert depending upon the switching means.

* * * * *